United States Patent
Forbus

(10) Patent No.: US 7,553,429 B2
(45) Date of Patent: Jun. 30, 2009

(54) TRACTION FLUID COMPOSITION

(75) Inventor: Thomas R. Forbus, Lexington, KY (US)

(73) Assignee: Ashland Licensing And Intellectual Property, LLC, Dublin, OH (US)

( * ) Notice: Subject to any disclaimer, the term of this patent is extended or adjusted under 35 U.S.C. 154(b) by 260 days.

(21) Appl. No.: 11/499,838

(22) Filed: Aug. 4, 2006

(65) Prior Publication Data

US 2007/0057226 A1    Mar. 15, 2007

Related U.S. Application Data

(60) Provisional application No. 60/705,353, filed on Aug. 4, 2005, provisional application No. 60/709,671, filed on Aug. 22, 2005, provisional application No. 60/791,852, filed on Apr. 13, 2006.

(51) Int. Cl.
    C09K 5/00    (2006.01)
    F16H 15/01   (2006.01)

(52) U.S. Cl. .................. 252/73; 508/208; 585/25; 252/78.3; 476/7

(58) Field of Classification Search ............. 252/73, 252/78.3; 508/208; 585/25; 476/7
    See application file for complete search history.

(56) References Cited

U.S. PATENT DOCUMENTS

| | | | | |
|---|---|---|---|---|
| 2,618,601 | A * | 11/1952 | Moreton ............. | 508/215 |
| 3,994,816 | A * | 11/1976 | Wygant ............. | 252/73 |
| 4,059,534 | A * | 11/1977 | Morro et al. ......... | 508/208 |
| 4,097,393 | A * | 6/1978  | Cupper et al. ....... | 252/78.3 |
| 4,190,546 | A * | 2/1980  | Kulik et al. ......... | 508/208 |
| 4,449,415 | A   | 5/1984  | Groenhof | |
| 4,577,523 | A * | 3/1986  | Groenhof ........... | 476/7 |
| 5,595,680 | A   | 1/1997  | Bryant et al. | |
| 6,191,330 | B1  | 2/2001  | Matsuno et al. | |
| 6,242,393 | B1  | 6/2001  | Ishida et al. | |
| 6,320,088 | B1  | 11/2001 | Matsuno et al. | |
| 6,602,830 | B1* | 8/2003  | Fey et al. .......... | 508/208 |
| 6,623,399 | B2* | 9/2003  | Fey et al. .......... | 476/7 |
| 6,638,417 | B2  | 10/2003 | Ishida et al. | |
| 6,828,286 | B2  | 12/2004 | Komiya et al. | |
| 2001/0010293 | A1 | 8/2001 | Ishida et al. | |
| 2002/0072478 | A1 | 6/2002 | Ishida et al. | |

(Continued)

FOREIGN PATENT DOCUMENTS

EP    0 075 327 A2    3/1983

(Continued)

OTHER PUBLICATIONS

Non-Final Official Action directed to U.S. Appl. No. 11/499,910, mailed Jul. 25, 2008.

*Primary Examiner*—Mark Eashoo
*Assistant Examiner*—Jane L Stanley
(74) *Attorney, Agent, or Firm*—Wood, Herron & Evans, LLP

(57) ABSTRACT

The present invention utilizes simple dimethylsilicone fluids of the proper viscosity/molecular weight distribution to modify the low temperature properties of cycloaliphatic hydrocarbon fluids. Addition of the dimethylsilicone fluid to cycloaliphatic fluids improves their low temperature performance without degrading the requisite elastohydrodynamic shear strength properties. Low viscosity dimethylsilicone lubricating fluids combined with cycloaliphatic hydrocarbon fluids are suitable for use in infinitely variable transmissions and other traction-drive transmission providing good low temperature flow properties and high elastohydrodynamic shear strength.

15 Claims, 1 Drawing Sheet

Table of Properties and Performance

EFFECT of DIMETHICONE on LOW TEMPERATURE PROPERTIES of NAPHTHENIC-BASED LUBRICANT FORMULATION

| Components | Example Base | Example 1 | Example 2 | Example 3 | Example 4 |
|---|---|---|---|---|---|
| Naphthenic Base Oil 100 SUS | 90.80 | 88.30 | 85.80 | 83.30 | 80.80 |
| Dimethicone Fluid, 10 cSt @ 77F | — | 2.50 | 5.00 | 7.50 | 10.00 |
| Performance Additive Pkg | 5.00 | 5.00 | 5.00 | 5.00 | 5.00 |
| Viscosity Modifier | 4.00 | 4.00 | 4.00 | 4.00 | 4.00 |
| Antifoam Additive | 0.20 | 0.20 | 0.20 | 0.20 | 0.20 |
| Tests | | | | | |
| KV 40C, cSt | 29.20 | 28.00 | 26.75 | 25.61 | 24.61 |
| KV 100C, cSt | 5.05 | 5.01 | 4.98 | 4.95 | 4.92 |
| VI | 102 | 104 | 113 | 116 | 125 |
| CCS Dynamic Viscosity, cP | | | | | |
| -20C | 2716 | 2170 | 1770 | 1528 | 1239 |
| -30C | 11220 | 8242 | 6731 | 5297 | 4295 |
| MTM Traction Coefficient | | | | | |
| Steel Specimens, 90C, 1.25 GPa, 4 meters/sec, 4% slip | 0.066 | 0.066 | 0.066 | 0.066 | 0.066 |

U.S. PATENT DOCUMENTS

| | | |
|---|---|---|
| 2003/0220206 A1 | 11/2003 | Komiya et al. |
| 2004/0192562 A1 | 9/2004 | Morita |
| 2005/0026790 A1 | 2/2005 | Komatsubara et al. |

FOREIGN PATENT DOCUMENTS

| | | |
|---|---|---|
| EP | 0 143 462 A2 | 6/1985 |
| EP | 0 699 738 A1 | 3/1996 |
| EP | 0 713 908 A1 | 5/1996 |
| EP | 0 719 853 A2 | 7/1996 |
| EP | 0 721 978 A2 | 7/1996 |
| EP | 0 798 367 A2 | 10/1997 |
| WO | WO 03/057806 A1 | 7/2003 |
| WO | WO 03/057895 A2 | 7/2003 |

* cited by examiner

| Table of Properties and Performance |||||||
|---|---|---|---|---|---|
| EFFECT of DIMETHICONE on LOW TEMPERATURE PROPERTIES of NAPHTHENIC-BASED LUBRICANT FORMULATION |||||||
| Components | Example Base | Example 1 | Example 2 | Example 3 | Example 4 |
| Naphthenic Base Oil 100 SUS | 90.80 | 88.30 | 85.80 | 83.30 | 80.80 |
| Dimethicone Fluid, 10 cSt @ 77F | --- | 2.50 | 5.00 | 7.50 | 10.00 |
| Performance Additive Pkg | 5.00 | 5.00 | 5.00 | 5.00 | 5.00 |
| Viscosity Modifier | 4.00 | 4.00 | 4.00 | 4.00 | 4.00 |
| Antifoam Additive | 0.20 | 0.20 | 0.20 | 0.20 | 0.20 |
| Tests | | | | | |
| KV 40C, cSt | 29.20 | 28.00 | 26.75 | 25.61 | 24.61 |
| KV 100C, cSt | 5.05 | 5.01 | 4.98 | 4.95 | 4.92 |
| VI | 102 | 104 | 113 | 116 | 125 |
| CCS Dynamic Viscosity, cP | | | | | |
| -20C | 2716 | 2170 | 1770 | 1528 | 1239 |
| -30C | 11220 | 8242 | 6731 | 5297 | 4295 |
| MTM Traction Coefficient Steel Specimens, 90C, 1.25 GPa, 4 meters/sec, 4% slip | 0.066 | 0.066 | 0.066 | 0.066 | 0.066 |

FIG. 1

TRACTION FLUID COMPOSITION

CROSS REFERENCE TO RELATED APPLICATIONS

This application claims priority from U.S. Provisional application Ser. No. 60/705,353 filed on Aug. 4, 2005 and U.S. Provisional application Ser. No. 60/709,671 filed on Aug. 22, 2005 and U.S. Provisional application Ser. No. 60/791,852 filed on Apr. 13, 2006 all of which are incorporated by reference in their entirety. The present invention is related to U.S. application Ser. No. 11/499,910 filed on Aug. 4, 2006.

FIELD OF THE INVENTION

The invention relates to the field of providing low viscosity dimethylsilicone fluids suitable for use in infinitely variable transmission fluids that provide a balance of good low temperature flow properties and high elastohydrodynamic (EHD) shear strength.

BACKGROUND OF THE INVENTION

An infinitely variable speed transmission (traction drive) fluid has similar responsibilities to normal (geared) transmission (i.e. automatic transmission) fluids in that it must serve as a lubricant, coolant, and in some cases, hydraulic fluid. A traction or infinitely variable transmission (IVT) fluid has the added responsibility of transmitting torque from an input devise to the output through the lubricating film that it forms in the contact(s) between smooth rolling-sliding rotating elements of the transmission. Thus the fluid is required to exhibit high shear strength in the high shear stress EHD conditions found in the area of contact between the rolling-sliding drive elements which are separated and lubricated by a thin film of the IVT fluid. The fluid's resistance to shear (shear strength) in the contact provides the torque transmitting capability of the fluid composition.

Lubricating fluids suitable for use in infinitely variable transmissions for most equipment employed in outdoor applications need a critical balance of good low temperature flow properties and high EHD shear strength; and, particularly shear strength at a combination of high temperatures and low contact stresses. Cycloaliphatic hydrocarbons generally have superior shear strength properties but very poor low temperature properties compared to more typical hydrocarbon-based fluids employed for producing good lubricants. Other fluids with good low temperature properties can be incorporated which improve the low temperature properties of the mixture but generally these cause significant undesirable loss of the shear strength properties. It has now been found that simple low-viscosity dimethylsilicone fluids can accomplish the desired balance of these properties.

One of the bases of this concept, improvement of low temperature properties of cycloaliphatic fluids with silicone fluids is not new. Many types of aliphatic, cycloaliphatic and aromatic containing silicone fluids have been reported for this purpose and specifically for traction fluids. However, no report has been found that introduces just simple dimethylsilicone fluids as low temperature improvers. One reason may be the generally poor hydrocarbon solubility of most dimethylisilicone fluids which could be construed as limiting their utility. Therefore, other inventors have focused on silicone fluids containing other functional besides mainly methyls in an effort to avoid the perceived incompatibility issue; or, have resorted to incorporation a third component fluid in traction fluid formulations, such as aromatic hydrocarbons or esters in the mixture to induce the compatibility of the dimethylsilicone fluid in the hydrocarbon fluid.

These traction fluids which consist essentially of cycloaliphatic hydrocarbon in combination with the dimethylsilicone fluids serve as base oils to which additional additives may be added to form fully-formulated automatic transmission fluids for infinitely variable transmission fluids. These additives include antioxidant agents, antiwear agents, extreme pressure agents, detergents, dispersants, antifoamer, anti-rust agents, friction modifiers, and viscosity modifier additives. The silicone oil for the purposes of the instant invention used may consist essentially of up to but less than 10% other appropriate functional groups, longer-chain aliphatic, cycloalipahatic or aromatic, or combinations of these functionalities besides methyls to further enhance performance and the performance of the fully-blended traction drive or infinitely variable transmission fluid.

DESCRIPTION OF THE PRIOR ART

Infinite variable transmissions generally need a critical balance of good low temperature flow properties and high EHD shear strength, especially at a combination of high temperature and low contact stress. Cycloaliphatic hydrocarbons generally have good performance of the latter but poor low temperature properties. Other fluids with good low temperature properties can be incorporated which improve the low temperature properties of the mixture but generally these cause significant undesirable loss of the shear strength properties.

Most conventional compositions of dimethylsilicone fluids exhibit poor hydrocarbon solubility which often limited their utility. Thus, these conventional dimethylsilicone fluids have been used with other functionality beside all or mostly methyl in an effort to avoid the incompatibility issue.

Mixed aliphatic, cycloaliphatic and aromatic containing silicone fluids have been used for traction fluids; however simple dimethylsilicone fluids as low temperature flow improvers in traction fluid formulations have not been utilized for traction drive transmission applications prior to this instant invention. As set forth in U.S. Pat. No. 4,449,415 by Groenhof which issued in May of 1984 and is incorporated by reference herein teaches that siloxanes in general have traction coefficients too low to be useful in traction drive devices. Moreover, the Groenhof reference teaches the use of 30 to 100 percent by weight of a trimethylsiloxy end blocked siloxane fluid and 30 to 70 percent by weight of a cycloaliphatic hydrocarbon or a mixture of cycloaliphatic hydrocarbons. U.S. Pat. No. 4,577,523 to Groenhof which issued in Mar. 25 of 1986 and is hereby incorporated by reference herein teaches the use of polyorganosiloxane traction fluids suitable for use at low temperatures. U.S. Pat. No. 6,602,830 by Fey et al. issued in August of 2003 and U.S. Pat. No. 6,623,399 by Fey, et al., which issued Sep. 23, 2003 both of which are incorporated herein by reference teach the use of blends of organic oils and siloxane compositions because the organic oils tend to get very viscous at low temperatures.

Other reports detail incorporating a third fluid such as an aromatic hydrocarbon or ester in the mixture to solubilize the dimethylsilicone fluids in the hydrocarbon fluids as set forth in the following references: U.S. Pat. No. 4,190,546 by Kulik et al. issued on Feb. 26, 1980 and utilizes a naphthenic hydrocarbon, (cycloaliphatic hydrocarbon), or mixture thereof together with a co-solvent and silicone fluid wherein the co-solvent is required to ensure complete miscibility of the silicone and naphthenic fluid.

Severely-hydrotreated naphthenic base oils are relatively low-cost fluids of appropriately low temperature viscosity with reasonably high EHD shear strength properties. These features make them reasonable candidate hydrocarbon fluids for use in traction drive and infinitely variable transmission fluid application. Although these have fluidity to very low temperatures, one of their drawbacks is their higher viscosity at lower temperatures than typical petroleum-based hydrocarbon base oils with far more aliphatic structures or component molecules. Therefore severely-hydrotreated naphthenic base oils would benefit for low temperature viscosity modification to bring their viscosity to a levels suitable for traction drive fluid applications in outdoor equipment. Many attempts have been made including the use of esters, aromatic compounds, and silicones. The silicones generally described for this purpose are relatively complex with multiple types of alkyl and aromatic functional groups and branched structures.

These traction drive fluids in addition to the base oils are formulated much as a typical transmission fluid would be formulated, utilizing antioxidant, antiwear, extreme pressure, detergent, dispersant, antifoam, anti-rust, friction modifier and viscosity modifier additives. The additive package does not have to be limited to these specific types of additives or may not require all the additives set forth here. Minor amounts of additional basestock(s) to fine-tune a desired performance feature or features of the fluid may also be used, but are not required.

Additionally, the silicone oil for the purposes of the instant invention used may contain up to but less than 10% other appropriate functional groups, longer-chain aliphatic, cycloalipahatic or aromatic, or combinations of these functionalities besides methyls to further enhance performance and the performance of the fully-blended traction drive or infinitely variable transmission fluid.

SUMMARY OF THE INVENTION

The present invention utilizes simple dimethylsilicone fluids of the proper viscosity/molecular weight distribution added to modify the low temperature properties of cycloaliphatic hydrocarbons. Addition of the dimethylsilicone fluid to the cycloaliphatic hydrocarbon improves the low temperature performance without degrading the requisite EHD shear strength properties.

Simple dimethylsilicone fluids (dimethicone) of the proper viscosity/molecular weight distribution serve very well for significantly modifying the low temperature properties of cycloaliphatic hydrocarbon fluids, including naphthenic base oils, without degrading the desired EHD shear strength (traction) properties. The preferred viscosity range of the dimethylsilicone fluid is roughly from >5 to <50 centistokes at 77° F. (or roughly 2 to 30 centistokes at 100° C. Higher viscosity dimethylsilicone oils (50 centistokes or higher at 77° F.) were not found to be appropriate for this type of lubricant as they are not miscible to any useful degree at the low temperature (−20° C. or 0 F. and below).

Additionally, the low temperature viscosmetrics of the product are very substantially modified by small amounts of the low viscosity dimethylsilicone fluids without any reduction of the EHD shear strength (traction coefficients) of the blended fluid.

This technology allows full-formulated infinitely variable transmission fluids of 3.5-6.0 centistokes at 100° C. to be formulated that have −20° C. Brookfield viscosities of 100 Poise or less. Infinitely variable transmission fluids with −20° C. Brookfield viscosities of roughly 20 Poise, made using this blending strategy, does not compromise EHD shear strength properties.

A preferred viscosity range for the dimethysilicone fluid is less than 20 centistokes and more preferably from about 5 to 15 centistokes at 77° F., (or about 2 to 10 centistokes at 100° C.). Higher viscosities, (20 centistokes or more at 77° F.), dimethylsilicone oils are not fully miscible in the required low temperatures regime of −20° C. and below and are not suitable for modification of the cycloaliphatic hydrocarbons for applications of the present invention.

With proper selection of the viscosity grade/molecular weight distribution of the dimethysilicone fluid a stable fluid is obtained to requisite low temperature of −30° C. and below. Advantageously, the low-temperature viscometrics of the blended products are substantially modified by co-blending of light dimethysilicone fluids into the cyclic hydrocarbon oil without reduction of the EHD shear strength of the blended fluids.

Utilization of the instant formulation allows a fully-formulated infinitely variable transmission traction fluids having from about 3.5 to about 6.0 centistokes at 100° C. to be formulated that have −30° C. Brookfield viscosities down to 40 poise without compromising fluid EHD shear strength properties. The lack of any degradation of EHD shear strength properties on a naphthenic oil product containing up to 10% by weight 10 cSt @ 77° F. dimethicone fluid suggests that with naphthenic stocks even higher amounts of dimethicone fluids could be used to even further modify low temperature properties without losses in EHD shear strength of the resulting fluid product.

These traction fluids which contain the cycloaliphatic hydrocarbon, such as naphthenic base oil, in combination with the dimethylsilicone fluids serve as base oils to which additional additives may be added to form fully-formulated automatic transmission fluids for infinitely variable transmission fluids. These fluids in addition to the base oils are fully-formulated much as traditional transmission fluids would be formulated, utilizing antioxidant, antiwear, extreme pressure, detergent, dispersant, antifoam, antirust, friction modifier and viscosity modifier additives. The additive package does not have to be limited to these specific types of additives or may not require all the additives set forth here. Minor amounts of additional basestock(s) to fine-tune a desired performance feature or features of the fluid may also be used, but are not required.

Additionally, the silicone oil used may contain up to 10% other functional groups besides methyls to further enhance its performance and the performance of they fully-blended infinitely variable transmission fluid.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the several views and wherein FIG. 1 is a table of properties and performance data showing the effect of dimethicone on low temperature properties of naphthenic based lubricant formulations.

DESCRIPTION OF THE PREFERRED EMBODIMENT

The present invention relates to a traction drive fluid for use with at least two relatively rotatable members in a torque-transmitting relationship and a traction fluid disposed on the tractive surfaces of the members, said traction fluid comprising a cycloaliphatic hydrocarbon fluid and a dimethylsilicone fluid.

The present invention provides a traction fluid base stock having the good viscometric properties (low viscosity) typical of dimethylsilicone fluids at low temperatures and the high EHD shear strength properties typical of cycloaliphatic hydrocarbons. Additives provide the desired properties to formulate traction drive or infinitely variable transmission fluid that gives a high thermal conductivity and improved heat transfer capability compared to conventional fluids of the same medium. In the present invention the fluid medium is targeted in its viscosity, friction, and antioxidant characteristics to perform in modem traction drive and infinite variable transmissions.

Oil Basestocks

The present invention utilizes a cycloaliphatic hydrocarbon fluids which exhibit high EHD shear strength properties over a wide range of conditions; however, it has very poor low temperature flow properties. Use of the cycloaliphatic fluids in many traction fluid and infinitely variable transmission applications requires some or even significant flow modification to alter their viscosities to an acceptable range at low temperatures.

The present invention utilizes simple dimethylsilicone fluids (dimethicone) of the proper viscosity/molecular weight distribution added to modify the low temperature properties of cycloaliphatic hydrocarbons to improve the low temperature performance without degrading the requisite high EHD shear strength properties.

A preferred viscosity range for the dimethysilicone fluid is less than 20 centistokes and more preferably from about 5 to 15 centistokes at 77° F., (or about 2 to 10 centistokes at 100° C.). Higher viscosities, (20 centistokes or more at 77° F.), dimethylsilicone oils are not fully miscible in the required low temperatures regime of −20° C. and below and are not suitable for modification of the cycloaliphatic hydrocarbons for traction fluid applications of the present invention. The low temperature viscometrics of the product are substantially modified by limited co-blending of such low viscosity dimethysilicone fluids into the cyclic hydrocarbon oil without substantial reduction of the EHD shear strengths of the blended fluids.

Utilization of the instant formulation allows a fully formulated infinitely variable transmission traction fluid having from about 3.5 to about 6.0 centistokes at 100° C. to be formulated that have −30° C. Brookfield viscosities of 40 poise which do not degrade EHD shear strength properties.

These traction fluids which contain the cycloaliphatic hydrocarbon in combination with the dimethylsilicone fluids serve as base oils to which additional additives may be added to form fully-formulated automatic transmission fluids for infinitely variable transmission fluids. These additives include antioxidant agents, antiwear agents, extreme pressure agents, detergents, dispersants, antifoamer, anti-rust agents, friction modifiers, and viscosity modifier additives.

The silicone oil used may contain up to 10 percent by weight of other functional groups besides methyl to further enhance the performance of the full blended infinitely variable transmission fluids.

The following examples provide support for the formulation of infinitely variable transmission base oil fluid formulations. The control or standard to which the traction fluid base composition of the instant invention is compared is for SANTOTRAC 50 which is used as a reference fluid in industry for high EHD shear strength properties.

Dispersants used in Lubricant Industry

Dispersants used in the lubricant industry are typically used to disperse the "cold sludge" formed in gasoline and diesel engines, which can be either "ashless dispersants", or containing metal atoms. They can be used in the instant invention since they are found to be an excellent dispersing agent. They are also needed to disperse wear debris and products of lubricant degradation within the transmission.

The ashless dispersants commonly used in the automotive industry contain a lipophilic hydrocarbon group and a polar functional hydrophilic group. The polar functional group can be of the class of carboxylate, ester, amine, amide, imine, imide, hydroxyl, ether, epoxide, phosphorus, ester carboxyl, anhydride, or nitrile. The lipophilic group can be oligomeric or polymeric in nature, usually from 70 to 200 carbon atoms to ensure good oil solubility. Hydrocarbon polymers treated with various reagents to introduce polar functions include products prepared by treating polyolefins such as polyisobutene first with maleic anhydride, or phosphorus sulfide or chloride, or by thermal treatment, and then with reagents such as polyamine, amine, ethylene oxide, etc.

Of these ashless dispersants the ones typically used in the petroleum industry include N-substituted polyisobutenyl succinimides and succinates, alkyl methacrylate-vinyl pyrrolidinone copolymers, alkyl methacrylate-dialkylaminoethyl methacrylate copolymers, alkylmethacrylate-polyethylene glycol methacrylate copolymers, and polystearamides. Preferred oil-based dispersants that are most important in the instant application include dispersants from the chemical classes of alkylsuccinimide, succinate esters, high molecular weight amines, Mannich base and phosphoric acid derivatives. Some specific examples are polyisobutenyl succinimide-polyethylencpolyamine, polyisobutenyl succinic ester, polyisobutenyl hydroxybenzyl-polyethylencpolyamine, bis-hydroxypropyl phosphorate. Commercial dispersants suitable for transmission fluid are for example, Lubrizol 890 (an ashless PIB succinimide), Lubrizol 6420 (a high molecular weight PIB succinimide), ETHYL HITEC 646 (a non-boronated PIB succinimide). The dispersant may be combined with other additives used in the lubricant industry to form a dispersant-detergent (DI) additive package for transmission fluids, e.g., LUBRIZOL 9677MX, and the whole DI package can be used as dispersing agent

Other Types of Dispersants

Alternatively a surfactant or a mixture of surfactants with low HLB value (typically less than or equal to 8), preferably nonionic, or a mixture of nonionics and ionics, may be used in the instant invention.

The dispersants selected should be soluble or dispersible in the liquid medium. The dispersant can be in a range of up from 0.01 to 30 percent, more preferably in a range of from between 0.5 percent to 20 percent, more preferably in a range of from between 1 to 15 percent, and most preferably in a range of from between 2 to 13 percent.

Other Chemical Compounds

This dispersion may also contain a large amount of one or more other chemical compounds, preferably polymers, not for the purpose of dispersing, but to achieve thickening or other desired fluid characteristics. These can be added but reduce the amount of particulate that can be used without excessive thickening.

The viscosity improvers used in the lubricant industry can be used in the instant invention for the oil medium, which include olefin copolymers (OCP), polymethacrylates (PMA), hydrogenated styrene-diene (STD), and styrene-polyester (STPE) polymers. Olefin copolymers are rubber-like materials prepared from ethylene and propylene mixtures through vanadium-based Ziegler-Natta catalysis. Styrene-diene polymers are produced by anionic polymerization of styrene and butadiene or isoprene. Polymethacrylates are produced by free radical polymerization of alkyl methacrylates. Styrene-polyester polymers are prepared by first co-polymerizing styrene and maleic anhydride and then esterifying the intermediate using a mixture of alcohols.

Other compounds which can be used in the instant invention in the oil medium include: acrylic polymers such as polyacrylic acid and sodium polyacrylate, high-molecular-weight polymers of ethylene oxide such as Polyox WSR from Union Carbide, cellulose compounds such as carboxymethylcellulose, polyvinyl alcohol (PVA), polyvinyl pyrrolidone (PVP), xanthan gums and guar gums, polysaccharides, alkanolamides, amine salts of polyamide such as DISPAR-LON AQ series from King Industries, hydrophobically modified ethylene oxide urethane (e.g., ACRYSOL series from Rohmax), silicates, and fillers such as mica, silicas, cellulose, wood flour, clays (including organoclays) and clays, and resin polymers such as polyvinyl butyral resins, polyurethane resins, acrylic resins and epoxy resins.

Chemical compounds such as seal swell agents or plasticizers can also be used in the instant invention and may be selected from the group including phthalate, adipate, sebacate esters, and more particularly: glyceryl tri(acetoxystearate), epoxidized soybean oil, epoxidized linseed oil, N, n-butyl benzene sulfonamide, aliphatic polyurethane, epoxidized soy oil, polyester glutarate, polyester glutarate, triethylene glycol caprate/caprylate, long chain alkyl ether, dialkyl diester glutarate, monomeric, polymer, and epoxy plasticizers, polyester based on adipic acid, hydrogenated dimer acid, distilled dimer acid, polymerized fatty acid trimer, ethyl ester of hydrolyzed collagen, isostearic acid and sorbian oleate and cocoyl hydrolyzed keratin, PPG-12/PEG-65 lanolin oil, dialkyl adipate, alkylaryl phosphate, alkyl diaryl phosphate, modified triaryl phosphate, triaryl phosphate, butyl benzyl phthalate, octyl benzyl phthalate. alkyl benzyl phthalate, dibutoxy ethoxy ethyl adipate, 2-ethylhexyldiphenyl phosphate, dibutoxy ethoxy ethyl formyl, diisopropyl adipate, diisopropyl sebacate, isodecyl oieate, neopentyl glycol dicaprate, neopenty giycol diotanoate, isohexyl neopentanoate, ethoxylated lanolins, polyoxyethylene cholesterol, propoxylated (2 moles) lanolin alcohols, propoxylated lanoline alcohols, acetylated polyoxyethylene derivatives of lanoline, and dimethylpolysiloxane. Other plasticizers which may be substituted for and/or used with the above plasticizers including glycerine, polyethylene glycol, dibutyl phthalate, and 2,2,4-trimethyl-1,3-pentanediol monoisobutyrate, and diisononyl phthalate all of which are soluble in a solvent carrier. Other seal swelling agents such as LUBRIZOL 730 can also be used.

Antioxidants are an important part of transmission fluids. General classes include zinc dialkyldithiophosphates, alkyl and aryl phenols, alkyl and aryl amines, and sulfurized olefins. Commercial examples are CIBA L57 (arylamine) and ETHYL HITEC 1656.

Pour point depressants, either of polymethyl methacrylate or ethylene propylene olefin co-polymer type are useful to decrease the low temperature Brookfield viscosity of the fluid. Examples include ROHMAX 3008, ROHMAX 1-333, LUBRIZOL 6662A.

Friction Modifiers are used to control friction and torque characteristics of the fluid. Commercial examples include LUBRIZOL 8650 and HITEC 3191.

EXAMPLES

The following examples describe preferred embodiments of the invention. Other embodiments within the scope of the claims herein will be apparent to one skilled in the art from consideration of the specification or practice of the invention as disclosed herein. It is intended that the specification, together with the examples, be considered exemplary only, with the scope and spirit of the invention being indicated by the claims which follow the examples. In the examples, all percentages are given on a weight basis unless otherwise indicated.

Base Control

| Component | Weight Percent |
| --- | --- |
| Naphthenic Base Oil 100 SUS | 90.80 |
| Dimethicone Fluid, 10 cST@77 F. | — |
| Performance Additive Package | 5.00 |
| Viscosity Modifier | 4.00 |
| Antifoam additive | 0.20 |

| Tests | Unit |
| --- | --- |
| KV 40 C., cST | 29.20 |
| KV 100 C., cST | 5.05 |
| Viscosity Index | 102 |
| CCS Dynamic Viscosity, cP | |
| −20 C. | 2716 |
| −30 C. | 11220 |
| MTM Traction Coefficient (Steel Specimens, 90 C., 1.25 GPA, 4 meters/sec, 4% slip) | 0.066 |

Example 1

| Component | Weight Percent |
| --- | --- |
| Naphthenic Base Oil 100 SUS | 88.30 |
| Dimethicone Fluid, 10 cST@77 F. | 2.50 |
| Performance Additive Package | 5.00 |
| Viscosity Modifier | 4.00 |
| Antifoam additive | 0.20 |

-continued

| Tests | Unit |
|---|---|
| KV 40 C., cST | 28.00 |
| KV 100 C., cST | 5.01 |
| Viscosity Index | 104 |
| CCS Dynamic Viscosity, cP | |
| −20 C. | 2170 |
| −30 C. | 8242 |
| MTM Traction Coefficient (Steel Specimens, 90 C., 1.25 GPA, 4 meters/sec, 4% slip) | 0.066 |

Example 2

| Component | Weight Percent |
|---|---|
| Naphthenic Base Oil 100 SUS | 85.80 |
| Dimethicone Fluid, 10 cST@77 F. | 5.00 |
| Performance Additive Package | 5.00 |
| Viscosity Modifier | 4.00 |
| Antifoam additive | 0.20 |

| Tests | Unit |
|---|---|
| KV 40 C., cST | 26.75 |
| KV 100 C., cST | 4.98 |
| Viscosity Index | 113 |
| CCS Dynamic Viscosity, cP | |
| −20 C. | 1770 |
| −30 C. | 6731 |
| MTM Traction Coefficient (Steel Specimens, 90 C., 1.25 GPA, 4 meters/sec, 4% slip) | 0.066 |

Example 3

| Component | Weight Percent |
|---|---|
| Naphthenic Base Oil 100 SUS | 83.30 |
| Dimethicone Fluid, 10 cST@77 F. | 7.50 |
| Performance Additive Package | 5.00 |
| Viscosity Modifier | 4.00 |
| Antifoam additive | 0.20 |

| Tests | Unit |
|---|---|
| KV 40 C., cST | 25.61 |
| KV 100 C., cST | 4.95 |
| Viscosity Index | 116 |
| CCS Dynamic Viscosity, cP | |
| −20 C. | 1528 |
| −30 C. | 5297 |
| MTM Traction Coefficient (Steel Specimens, 90 C., 1.25 GPA, 4 meters/sec, 4% slip) | 0.066 |

Example 4

| Component | Weight Percent |
|---|---|
| Naphthenic Base Oil 100 SUS | 80.80 |
| Dimethicone Fluid, 10 cST@77 F. | 10.00 |
| Performance Additive Package | 5.00 |
| Viscosity Modifier | 4.00 |
| Antifoam additive | 0.20 |

| Tests | Unit |
|---|---|
| KV 40 C., cST | 24.61 |
| KV 100 C., cST | 4.92 |
| Viscosity Index | 125 |
| CCS Dynamic Viscosity, cP | |
| −20 C. | 1239 |
| −30 C. | 4295 |
| MTM Traction Coefficient (Steel Specimens, 90 C., 1.25 GPA, 4 meters/sec, 4% slip) | 0.066 |

The foregoing detailed description is given primarily for clearness of understanding and no unnecessary limitations are to be understood therefrom, for modification will become obvious to those skilled in the art upon reading this disclosure and may be made upon without departing from the spirit of the invention and scope of the appended claims. Accordingly, this invention is not intended to be limited by the specific exemplification presented herein above. Rather, what is intended to be covered is within the spirit and scope of the appended claims.

I claim:

1. In a traction drive system having at least two relatively rotatable members in a torque transmitting relationship and a traction fluid disposed on the tractive surfaces of said members, the improvement comprising employing as said traction fluid, a fluid comprising:
   a cycloaliphatic hydrocarbon; and
   a dimethylsilicone fluid having a viscosity of less than 50 centistokes at 77° F., wherein said dimethylsilicone fluid constitutes less than about 10% by weight of said traction fluid and said dimethylsilicone fluid contains not more than 10% by weight of functional groups other than a methyl group.

2. The traction drive system traction fluid of claim 1 a wherein the dimethylsilicone fluid has a viscosity of less than 20 centistokes at 77° F.

3. The traction drive system traction fluid of claim 2, wherein said cycloaliphatic hydrocarbon is a naphthenic base oil.

4. The traction drive system traction fluid of claim 2, wherein said traction fluid includes a dispersant.

5. The traction drive system traction fluid of claim 1, wherein said cycloaliphatic hydrocarbon is a naphthenic base oil.

6. The traction drive system traction fluid of claim 1, wherein said fluid includes a dispersant.

7. The traction drive system traction fluid of claim 1, wherein said dimethylsilicone fluid has a viscosity in a range from 5 to 15 centistokes at 77° F.

8. The traction drive system traction fluid of claim 1, wherein said dimethylsilicone fluid has a viscosity in a range from 2 to 10 centistokes at 100° C.

9. A traction drive system consisting essentially of at least two relatively rotatable members in a torque-transmitting relationship and a traction fluid disposed on the tractive surfaces of said members, said traction fluid comprising:

a cycloaliphatic hydrocarbon; and a dimethylsilicone fluid having a viscosity of less than 20 centistokes at 77° F., wherein said dimeth lsilicone fluid constitutes less than about 10 % b wei lit of said traction fluid and said dimethylsilicone fluid contains not more than 10% by weight of functional groups other than a methyl group.

10. The traction drive system traction fluid of claim 9, wherein said cycloaliphatic hydrocarbon is a naphthenic base oil.

11. The traction drive system traction fluid of claim 9, wherein said traction fluid includes a dispersant.

12. The traction drive system traction fluid of claim 9, wherein said dimethylsilicone fluid has a viscosity in a range from 5 to 15 centistokes at 77° F.

13. The traction drive system traction fluid of claim 12, wherein said cycloaliphatic hydrocarbon is a naphthenic base oil.

14. The traction drive system traction fluid of claim 12, wherein said traction fluid includes a dispersant.

15. The traction drive system traction fluid of claim 9, wherein said dimethylsilicone fluid has a viscosity in a range from 2 to 10 centistokes at 100° C.

* * * * *

UNITED STATES PATENT AND TRADEMARK OFFICE
CERTIFICATE OF CORRECTION

| | | |
|---|---|---|
| PATENT NO. | : 7,553,429 B2 | Page 1 of 1 |
| APPLICATION NO. | : 11/499838 | |
| DATED | : June 30, 2009 | |
| INVENTOR(S) | : Thomas Forbus | |

It is certified that error appears in the above-identified patent and that said Letters Patent is hereby corrected as shown below:

Claim 2, column 10, line 47 "of claim 1 a wherein the" to read -- of claim 1 wherein the --.
Claim 9, column 11, line 5 "said dimeth lsilicone fluid" to read -- said dimethylsilicone fluid --.
Claim 9, column 11, line 6 "10% b wei ht of said" to read -- 10% by weight of said --.

Signed and Sealed this
Thirty-first Day of January, 2012

David J. Kappos
*Director of the United States Patent and Trademark Office*